Nov. 18, 1969  W. S. ANDERSON, JR  3,478,680
METHOD AND APPARATUS FOR DECORATING HOLLOW PLASTIC ARTICLES
Filed July 6, 1965

Inventor:
Winfield S. Anderson, Jr.
By
ATTORNEYS

United States Patent Office 3,478,680
Patented Nov. 18, 1969

3,478,680
METHOD AND APPARATUS FOR DECORATING HOLLOW PLASTIC ARTICLES
Winfield S. Anderson, Jr., Pitman, N.J., assignor to Owens-Illinois, Inc., a corporation of Ohio
Filed July 6, 1965, Ser. No. 469,379
Int. Cl. B44c 1/24; B41f 3/50
U.S. Cl. 101—32     4 Claims

ABSTRACT OF THE DISCLOSURE

Methods and apparatus for hot leaf stamping of plastic containers whose sides are flexible. A strip of pigmented foil is placed in contact with the surface to be printed and a vacuum chamber is sealed to the surface in overlying relationship to the foil. Application of a vacuum to the interior of the chamber draws the surface and foil into contact with a heated die which defines the inner wall of the chamber, the die bonding the foil to the surface.

This invention relates to methods and apparatus for decorating articles, and more particularly to methods and apparatus for hot leaf stamping of plastic containers whose sides are flexible.

The present invention is concerned with the application of a printed image or decoration to the surface of a plastic container by the so-called hot leaf stamping process. In this process, a strip of pigmented foil is placed in contact with the surface to be printed and pressed against the bottle surface by a heated die having a raised portion in the shape of the desired image. The heat and pressure applied by the die bond the pigment to the plastic surface.

Unfortunately, the pressure required in this operation is such that in the usual case the plastic container being decorated is not sufficiently stiff to resist deflection under the applied pressure. In order to stiffen the side surface, prior processes have, in some cases, applied air under pressure to the interior of the bottle. In other cases the bottle is enclosed within a cold mold and then inflated to force the bottle surface outwardly into contact with the raised portions of a heated die insulated from the cold mold. Where the cold mold is not employed, distortion of the image is quite common, the distortion being caused by flexing of the bottle side wall under the application of the internal pressure, the flexing in some instances being non-uniform by virtue of variations in the wall thickness of the article. While distortion is minimized in the cold mold process, this process suffers the disadvantage of being extremely expensive in its requirement for an accurately contoured cold mold having an insulated heated die section built into the mold.

It is a primary object of the invention to provide methods and apparatus for hot leaf stamping of hollow flexible plastic articles which enables the application of a pressure differential sufficient to rigidify the surface being printed while minimizing distortion of the applied decoration.

The foregoing, and other objects, are achieved by locating the heated die member in the interior of a boxlike chamber which is open at the side facing the article to be decorated. A pigmented foil strip is interposed between the heated die and the article surface and the chamber is advanced toward the article surface to engage the foil with the surface while the die is still at a spaced relationship to the foil. The edge of the chamber engaging the foil and article surface is provided with a seal so that when the foil contacts the article surface, a closed chamber is formed with the heated die located within the chamber. The chamber is then evacuated, thus drawing the bottle surface toward the die to press the foil against the raised or printing portions of the die face. This pressure differential may be, in some instances, assisted by supplying air under pressure to the interior of the article. However, the pressure differential forcing the bottle surface toward the die is applied only over a confined or localized region, thus minimizing distortion or stretching of the article surface. Other objects and features of the invention will become apparent by reference to the following specification and to the drawings.

Figure 1:
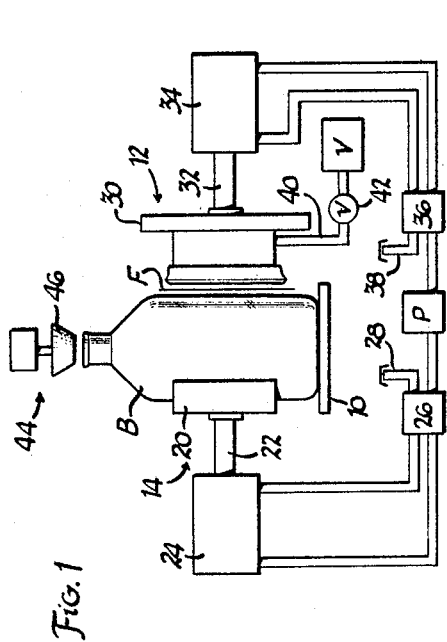
FIGURE 1 is a schematic diagram, partially in section, of an end elevational view of one form of apparatus embodying the present invention.
Figure 2:
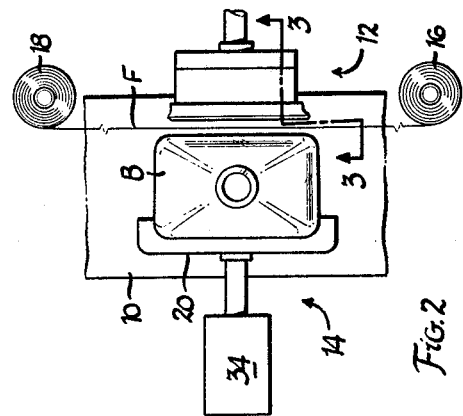
FIGURE 2 is a partial plan view, schematic in nature, of the apparatus of FIGURE 1 with certain parts broken away or omitted.

The general organization of the apparatus is best shown in FIGURES 1 and 2. Plastic containers in the form of bottles B are advanced, by any suitable conveying means such as a belt conveyor 10, into a decorating position at which the bottle is located between a die assembly designated generally 12 and a backup or holding assembly designated generally 14. A strip of pigmented foil leaf F is extended along one side of the path of travel of the bottles B and extends between die assembly 12 and the facing side of the bottle. The foil leaf F is supported and indexed as required by conventional apparatus which may include feed and take-up spools 16 and 18 (FIGURE 2).

Backup assembly 14 includes a bottle engaging plate 20 which may be supported for reciprocatory movement transversely of the path of movements of the bottles B upon the piston rod 22 of a pneumatic motor having a cylinder 24. As best seen in FIGURE 2, plate 20 of the backup assembly is conformed in general to the cross sectional shape of bottle B so that backup assembly 14 can be used to accurately register the bottle with die assembly 12. The rod and head ends of cylinder 24 are connected through a suitable four-way reversing valve 26 to a source of air under pressure P, valve 26 being provided with a vent port 28.

Die assembly 12 includes a die head designated generally 30 which is likewise supported upon the piston rod 32 of a second pneumatic motor having a cylinder 34. The rod and head ends of cylinder 34 are connected to a second four-way reversing valve 36, likewise connected to pressure source P and having a vent port 38. The interior of head 30 is connected by a conduit 40 to a vacuum source V through a conventional three-way valve 42 which is operable in one position to connect the interior of head 30 to source V and operable in a second position to connect the interior of head 30 to atmosphere.

In some situations, it may be desirable to apply air under pressure to the interior of the bottle B during the decorating operation. In such a situation, an inflating mechanism designated generally 44 is positioned above the bottle B and provided with a nozzle 46 adapted to be inserted into the mouth of bottle B to supply air under pressure to the interior of the bottle.

Figure 3:
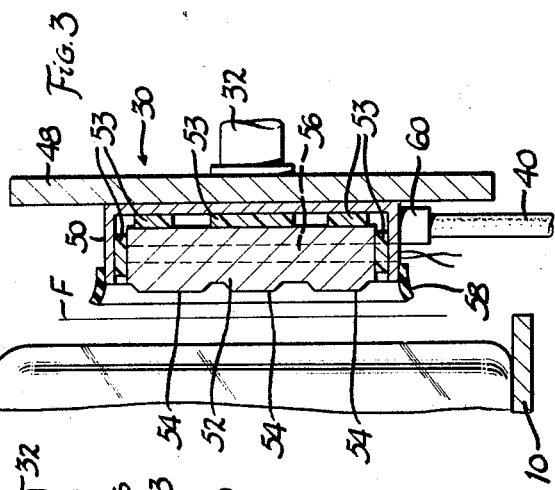
FIGURE 3 is a detail cross sectional view taken approximately on the line 3—3 of FIGURE 2 and showing a portion of the apparatus at one stage of its operation.
Figure 4:
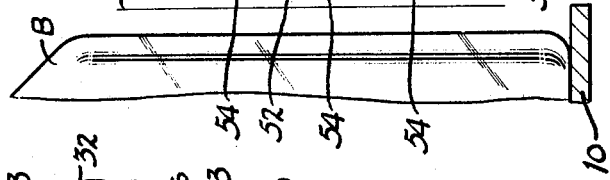
FIGURE 4 is a detail cross sectional view, similar to FIGURE 3, showing the apparatus at another stage of its operation.
Figure 5:
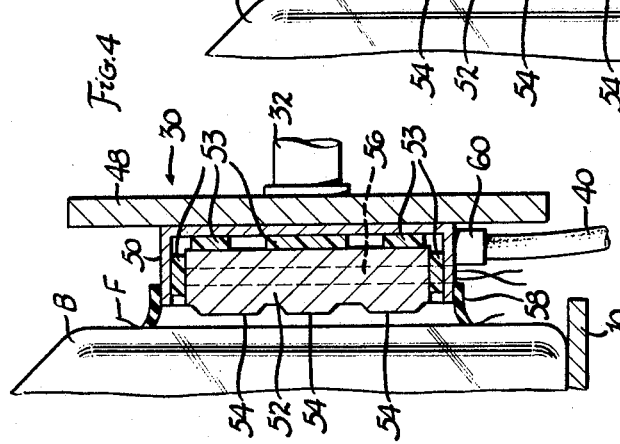
FIGURE 5 is a detail cross sectional view, similar to FIGURE 3, showing the apparatus at still another stage of its operation.

Details of die head 30 are best shown in FIGURE 3 through 5. Head 30 includes a backup late or frame 48 which is fixedly coupled to piston rod 32 and may be provided with sliding supports or guides, not shown. On the side of plate 48 facing bottle B, a hollow box-like structure 50 is mounted to define a chamber open at its side remote from plate 48. A print die 52 is mounted within box member 50 and is supported in thermally insulated and spaced relationship to the walls of box member 50 by means of a plurality of spacing elements 54 of thermal insulating material. The outwardly facing surface of print die 52 is formed with raised printing portions such as 54 which correspond in shape to the design of the decoration to be applied to the surface of bottle B. Die 52 is maintained at a desired temperature by one or more electric cartridge heaters 56 of conventional construction which may be provided with conventional thermostatic controls to maintain the desired die temperature.

A peripheral seal 58 of rubber or other suitable material extends around the periphery of the open side of box member 50 and projects outwardly beyond the edge of the box as best seen in FIGURE 3. It will be noted that the outside surface of print die 52 is substantially in alignment with the edge of box member 50, while the raised portions 54 of the print die project outwardly beyond the edge of the box. Seal 58 in turn projects outwardly beyond the raised portions 54 of the print die. A suitable coupling such as 60 is provided to connect conduit 40 to the interior of box member 50 to selectively evacuate or vent the interior of the box, dependent upon the condition of valve 42.

In operation, a bottle B to be stamped is fed along conveyor 10 until it is located in alignment with backup assembly 14 whose piston rod 22 is retracted at this time so that plate 20 is clear of the path travel of bottle. Bottle B may be located at the desired location as by means of a conventional conveyor stop, not shown, and the engagement of the bottle with such a stop may, for example, be employed to shift valve 26 to extend piston rod 22 to move plate 20 into engagement with the bottle as shown in FIGURES 1 and 2, thereby accurately aligning the bottle with die assembly 12. At this particularly point in time, the relative positions of the bottle B, foil leaf F and die head 30 is that shown in FIGURE 3.

Valve 36 is then shifted to extend piston rod 32, thereby moving head 30 from the position shown in FIGURE 3 to that shown in FIGURE 4. In the FIGURE 4 position seal 58 is lightly, but sealingly, engaged with the foil leaf F which in turn is pressed against the side of bottle B, the foil lead covering the area to be printed, hereinafter referred to as the printing area, on the side of the bottle. It will be appreciated that the edges of seal 54 are formed to the bottle surface in those cases where the bottle is of curved cross sectional area so that when the die assembly is in the FIGURE 4 position, the chamber within the interior of box member 50 is completely sealed from atmosphere. Foil leaf F is of the order of one mil in thickness and is easily flexed so that the foil does not interfere with the seal even in those cases where the foil does not completely cover the open side of box member 50.

After the seal is made as illustrated in FIGURE 4, valve 42 is shifted to connect the interior of the closed chamber defined by box member 50 and the sealingly engaged side of bottle B to vacuum source V to thereby evacuate the interior of box member 50. The interior of bottle B will normally at this time be opened to atmosphere or in some cases will be at a higher pressure when inflating mechanism 44 is employed. In any event, evacuation of the interior of box 50 creates a pressure differential over that region of the side of bottle B enclosed by seal 58 and this pressure differential draws the bottle bodily toward printing die 52 so that the side of the bottle firmly presses foil leaf F against the raised portions 54 of the heated printing die.

The FIGURE 5 position is held for a sufficient period of time to stamp the design upon the surface of the bottle.

At the completion of the required time period, valve 42 is shifted to connect the interior of box member 50 to atmosphere, thereby venting the vacuum. After the vacuum is vented from the interior of box member 50, valves 26 and 36 are reversed to retract piston rods 22 and 32 and the bottle is released to be moved beyond the decoration station by conveyor belt 10.

The flexing characteristics of seal 54 are such that the seal flexes much more easily than the bottle wall. Thus, upon the application of vacuum to the localized area of the bottle wall encompassing the printing area, the bottle is drawn bodily toward the die with substantially no distortion because of the seal flexes much more readily than the bottle wall. Because the raised portion 54 of the printing die project beyond the edge of box 50, contact through foil leaf F is made before any distortion of the bottle wall occurs. Thus, distortion of the printed image is substantially eliminated.

While one form of the invention has been described in detail, it will be apparent to those skilled in the art that the disclosed embodiment may be modified. Therefore, the foregoing description is to be considered exemplary rather than limiting and the true scope of the invention is that defined in the following claims.

I claim:

1. The method of applying a hot leaf stamping to a printing area on the side wall of a flexible plastic container comprising the steps of interposing a strip of foil leaf between the printing area of a flexible container side wall and a heated printing die having a raised printing portion thereon, contacting the entire printing area with the foil strip while maintaining the die in spaced relationship to the foil strip and peripherally sealing the die to the side of the container, and evacuating the sealed region of the die to draw the printing area of the side wall toward the die to press the foil against the printing portion of the die.

2. Apparatus for applying a hot leaf stamping to a printing area on the side wall of flexible plastic container comprising a hollow box-like head open at one side, a print die mounted in said head and having a raised printing portion exposed at said one side of said head, sealing means extending around the periphery of said one side of said head and projecting outwardly beyond said printing portion, means for extending a strip of foil leaf across said one side of said head in registry with said printing portion of said die, means for engaging the side wall of a container with said sealing means to close said one side of said head with said sealing means enclosing the printing area on said side wall, and means for evacuating the interior of said head to draw the side of said container toward said die to press said foil leaf against the printing portion of said die.

3. Apparatus for applying a hot leaf stamping to a printing area on the side wall of a flexible plastic container comprising a hollow box-like head defining a chamber having an open side of an area greater than said printing area, sealing means extending around the periphery of said one side of said head adapted to sealingly engage the side wall of a container around said printing area, a print die mounted in said chamber and having a raised printing portion exposed at said one side of said chamber, means thermally insulting said die from said head, means for heating said die, means for supporting a strip of foil leaf across said one side of said chamber in registry with said printing portion of said die, means for engaging the side wall of a container with said sealing means to close said one side of said chamber with said sealing means extending around the printing area on said side wall, and means for evacuating the interior of said chamber to draw the side of said container toward said die to press said foil leaf against the printing portion of said die.

4. Apparatus as defined in claim 3 wherein the raised portion of said die projects beyond said one side of said chamber, said sealing means comprising a strip of resilient sealing material projecting outwardly from said one side of said chamber beyond said raised portion of said die.

References Cited

UNITED STATES PATENTS

| 2,751,701 | 6/1956 | Grupe | 156—282 XR |
| 3,040,154 | 6/1962 | Marsa | 156—285 XR |
| 2,016,450 | 10/1935 | Myers | 101—35 |
| 2,077,790 | 4/1937 | Hakogi | 101—35 |
| 3,195,450 | 7/1965 | Sciame | 101—9 |

WILLIAM B. PENN, Primary Examiner

U.S. Cl. X.R.

101—9, 35; 156—282